United States Patent
Jiang et al.

(10) Patent No.: US 9,337,957 B2
(45) Date of Patent: May 10, 2016

(54) METHOD AND DEVICE FOR INTERLEAVING PROCESSING IN A WLAN SYSTEM

(71) Applicant: Huawei Technologies Co., Ltd., Shenzhen (CN)

(72) Inventors: Yanping Jiang, Shenzhen (CN); Li Wang, Shenzhen (CN); Qiang Wang, Shenzhen (CN); Jie Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/695,814

(22) Filed: Apr. 24, 2015

(65) Prior Publication Data

US 2015/0229441 A1 Aug. 13, 2015

Related U.S. Application Data

(63) Continuation of application No. PCT/CN2013/073391, filed on Mar. 28, 2013.

(30) Foreign Application Priority Data

Oct. 26, 2012 (CN) .......................... 2012 1 0417346

(51) Int. Cl.
*H04L 27/00* (2006.01)
*H04L 1/00* (2006.01)
(Continued)

(52) U.S. Cl.
CPC .............. *H04L 1/0042* (2013.01); *H04L 5/001* (2013.01); *H04L 27/26* (2013.01); *H04L 27/2627* (2013.01); *H04L 27/2634* (2013.01); *H04W 84/12* (2013.01)

(58) Field of Classification Search
CPC ....... H04L 1/0042; H04L 27/26; H04L 5/001; H04L 27/2627; H04L 27/2634; H04W 84/12
See application file for complete search history.

(56) References Cited

U.S. PATENT DOCUMENTS 7,127,004 B1 * 10/2006 Sonning ............ H03M 13/2707
375/295
2005/0135493 A1 6/2005 Maltsev et al.
(Continued)

FOREIGN PATENT DOCUMENTS

CN 101018223 A 8/2007
CN 101119352 A 2/2008
(Continued)

OTHER PUBLICATIONS

"IEEE Standard for Information technology; Telecommunications and information exchange between systems; Local and metropolitan area networks; Specific requirements; Part 11: Wireless LAN Medium Access Control(MAC) and Physical Layer (PHY) Specifications," IEEE Std 802.11, Institute of Electrical and Electronics Engineers, New York, New York (2012).

(Continued)

*Primary Examiner* — Dac Ha
(74) *Attorney, Agent, or Firm* — Leydig, Voit & Mayer, Ltd.

(57) ABSTRACT

The present invention provides a method and a device for interleaving processing in a WLAN system, and relates to the field of communications technologies. The method includes: obtaining, by a WLAN device, a predetermined number of identifiers of valid positions from any sub-interleaving processing contained in an interleaving processing; determining valid input positions of the interleaving processing according to the identifiers of the valid positions; transmitting data bits to be transmitted in the valid input positions, and transmitting bit 0 and/or bit 1 or no data bit in other non-valid input positions of the interleaving processing other than the valid input positions; modulating data bits transmitted in interleaving processing output positions to obtain modulation signals and mapping the modulation signals onto the corresponding data sub-carriers respectively. The present invention can be applied in interleaving processing of data bits to be transmitted.

20 Claims, 4 Drawing Sheets

(51) Int. Cl.
*H04L 27/26* (2006.01)
*H04L 5/00* (2006.01)
*H04W 84/12* (2009.01)

(56) References Cited

U.S. PATENT DOCUMENTS

| | | | | |
|---|---|---|---|---|
| 2009/0296840 | A1* | 12/2009 | Atungsiri | H04L 27/2602 375/260 |
| 2012/0063429 | A1 | 3/2012 | Yang et al. | |
| 2014/0105202 | A1* | 4/2014 | Hansen | H03M 13/27 370/338 |
| 2015/0128005 | A1* | 5/2015 | Jeong | H03M 13/036 714/752 |

FOREIGN PATENT DOCUMENTS

| CN | 101212437 A | 7/2008 |
|---|---|---|
| CN | 101374340 A | 2/2009 |

OTHER PUBLICATIONS

"Draft Standard for Information Technology; Telecommunications and information exchange between systems; Local and metropolitan area networks; Specific requirements; Part 11: Wireless LAN Medium Access Control (MAC) and Physical Layer (PHY) specifications; Amendment 4: Enhancements for Very High Throughput for Operation in Bands below 6 GHz," IEEE P802.11ac™/D3.1, pp. i-366, Institute of Electrical and Electronics Engineers, New York, New York (Aug. 2012).

Asghar et al., "Low Complexity Hardware Interleaver for MIMO-OFDM based Wireless LAN," Circuits and Systems, pp. 1747-1750, Institute of Electrical and Electronics Engineers, New York, New York (2009).

* cited by examiner

METHOD AND DEVICE FOR INTERLEAVING PROCESSING IN A WLAN SYSTEM

CROSS-REFERENCE TO RELATED APPLICATIONS

This application is a continuation of International Application No. PCT/CN2013/073391, filed on Mar. 28, 2013, which claims priority to Chinese Patent Application No. 201210417346.2, Oct. 26, 2012, both of which are hereby incorporated by reference in their entireties.

TECHNICAL FIELD

The present invention relates to the field of communications technologies, and particularly, to a method and a device for interleaving processing in a WLAN (Wireless Local Area Networks) system.

BACKGROUND

During communication in a WLAN system, errors of transmitted data bits often occur in a string. However, a channel encoding is only effective when a single error or an error string which is not very long is detected and corrected.

To solve the above mentioned problem, an interleaving processing technology is used to process the transmitted data bits. With the interleaving processing technology adopted, continuous transmitted data bits are dispersed, and the transmitted data bits may be transmitted in a discontinuous mode. Thus, even if a string of errors occurs in a transmission process, when a message of successive bit string is recovered, the errors are changed to single errors (or error strings with a shorter length), and then an error correction function of channel encoding is used to correct errors to recover originally transmitted data bits more precisely.

In 802.11a/g protocols, it is necessary to perform two times of sub-interleaving processing on transmitted data bits; in 802.11n/ac/ah protocols, it is necessary to perform three times of sub-interleaving processing on transmitted data bits; and interleaving processing parameters of any sub-interleaving processing may be determined by the number of data sub-carriers, i.e., when the number of data sub-carriers changes, the interleaving processing parameters need to be changed accordingly.

Additionally, the 802.11a/g/n/ac/ah protocols adopt an OFDM (Orthogonal Frequency Division Multiplexing, Orthogonal Frequency Division Multiplexing) technology for data transmission. The OFDM is a multi-carrier technology, which divides a frequency domain into several mutually orthogonal data sub-carriers, and maps modulation signals corresponding to the transmitted data bits after the interleaving processing and modulation onto the corresponding data sub-carriers for transmission respectively, and the number of data sub-carriers is fixed.

After the last sub-interleaving processing is performed, the output data bits to be transmitted may be modulated to obtain modulation signals, and then the modulation signals are mapped onto the corresponding data sub-carriers for transmission.

In the process of achieving the above mentioned interleaving processing, the inventor found that at least the following problems exist in the prior art: when frequency selective fading of a channel is serious, selecting a part of data sub-carriers for transmission may further improve system performance; however, when the number of data sub-carriers changes, the parameters for performing interleaving processing in an interleaver also need to be changed, and the interleaver in an actual chip implementation is fixed through hardware. Therefore, when the number of data sub-carriers changes, the parameters for performing interleaving processing in the interleaver need to be modified by modifying hardware, thus resulting in a high cost.

SUMMARY

The embodiments of the present invention provide a method and a device for interleaving processing in a WLAN system, which solves the problem that when the number of data sub-carriers changes, the interleaving parameters are changed accordingly and therefore interleaver hardware needs to be modified, thus resulting in a high cost.

To achieve the above object, the following technical solutions are adopted in the embodiments of the present invention.

In one aspect, an interleaving processing method in a WLAN system is provided, including:

obtaining, by a WLAN device, a predetermined number of identifiers of valid positions from any sub-interleaving processing contained in an interleaving processing, wherein the valid positions are input/output positions of any sub-interleaving processing and are used for transmitting data bits to be transmitted, and the number of the valid positions is less than the number of all input/output positions of any sub-interleaving processing;

determining valid input positions of the interleaving processing according to the identifiers of the valid positions;

transmitting the data bits to be transmitted in the valid input positions, and transmitting bit 0 and/or bit 1 or no data bit in other non-valid input positions of the interleaving processing other than the valid input positions;

modulating data bits transmitted in the output positions of the interleaving processing to obtain modulation signals and mapping the modulation signals onto the corresponding data sub-carriers respectively.

In a further aspect, a WLAN device is provided, including:

an interleaver, configured to perform interleaving processing on data bits to be transmitted;

a processor, configured to obtain a predetermined number of identifiers of valid positions from any sub-interleaving processing contained in the interleaving processing performed by the interleaver, wherein the valid position are input/output positions of any sub-interleaving processing and used for transmitting data bits to be transmitted, and the number of the valid positions is less than the number of all input/output positions of any sub-interleaving processing; determine valid input positions of the interleaving processing according to the identifiers of the valid positions; transmit the data bits to be transmitted in the valid input positions, and transmit bit 0 and/or bit 1 or no data bit in other non-valid input positions of the interleaving processing other than the valid input positions; modulating the data bits transmitted in output positions of the interleaving processing to obtain modulation signals and map the modulation signals onto the corresponding data sub-carriers respectively.

According to a method and a device for interleaving processing in a WLAN system which are provided in the embodiments of the present invention, with the above mentioned solution adopted, the WLAN device obtains a predetermined number of identifiers of valid positions from any sub-interleaving processing contained in the interleaving processing, wherein the valid positions are input/output positions of any sub-interleaving processing and are used for transmitting data bits to be transmitted, and the number of the valid positions is less than the number of all input/output positions of any sub-interleaving processing; determines valid input positions of the interleaving processing according to the identifiers of the valid positions; transmits the data bits to be transmitted in the valid input positions, and transmits bit 0 and/or bit 1 or no data bit in other non-valid input positions of the interleaving processing other than the valid input positions; modulates the data bits transmitted in output positions of the interleaving processing to obtain modulation signals and maps the modulation signals onto the corresponding data sub-carriers respectively. Thus, the number of data sub-carriers used by the interleaver keeps unchanged actually, still all data sub-carriers are used and interleaving parameters may thereby not be changed accordingly, avoiding the problem of a high cost due to modification of interleaver hardware.

BRIEF DESCRIPTION OF DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings may be obtained by those skilled in the art without any creative effort.

DESCRIPTION OF EMBODIMENTS

A clear and complete description of the technical solutions in the embodiments of the present invention will be given below, in combination with the accompanying drawings in the embodiments of the present invention. Apparently, the embodiments described below are merely a part, but not all, of the embodiments of the present invention. All of the other embodiments, obtained by those skilled in the art based on the embodiments of the present invention without any creative effort, fall into the protection scope of the present invention.

At present, in the 802.11a/g/n/ac/ah standard, when BCC (Binary Convolutional Code) is used for coding, interleaving processing in a frequency domain is needed, wherein two times of interleaving processing are needed in 802.11a/g standard, and three times of interleaving processing are needed in 802.11n/ac/ah standard due to the introduction of an MIMO (Multiple Input Multiple Output) technology. The method of sub-interleaving processing in 802.11a/g standard is as same as that of the first two times of sub-interleaving processing in 802.11n/ac/ah standard.

To describe the solution more clearly, firstly, a brief description of the method for performing three times of sub-interleaving processing in the 802.11n/ac/ah standard will be provided.

Figure 1:
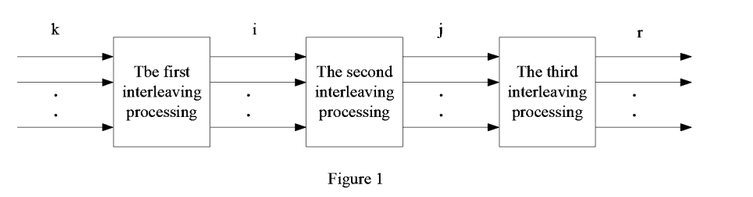
FIG. 1 is a schematic diagram for performing three times of sub-interleaving processing on data bits to be transmitted according to the present embodiment.

As shown in FIG. 1, a schematic diagram for performing three times of sub-interleaving processing on the data bits to be transmitted is illustrated.

The first sub-interleaving processing may ensure that adjacent data bits to be transmitted are mapped onto non-adjacent data sub-carriers. k represents a symbol of an input position of the first sub-interleaver, i represents a symbol of the corresponding output position (or a symbol of an input position of the second sub-interleaving processing) of the data bits to be transmitted after the first sub-interleaving processing; a mapping relationship between k and i may be as follows:

$$i = N_{ROW}(k \bmod N_{COL}) + \left\lfloor \frac{k}{N_{COL}} \right\rfloor, k = 0, 1, \ldots, N_{CBPSSI} - 1;$$

wherein, $N_{COL}$ and $N_{ROW}$ are known interleaving parameters of the first sub-interleaving processing; $N_{CBPSSI}$ is the number of input/output positions of the first sub-interleaving processing, and $N_{CBPSSI}$ is equal to the number of data sub-carriers multiplied by a modulation order; $\lfloor . \rfloor$ represents a round down operation. It is worthy of note that $N_{COL}$ and $N_{ROW}$ are determined by the number of data sub-carriers.

The second sub-interleaving processing may ensure that the adjacent data bits to be transmitted are mapped onto the most significant bit and least significant bit of a constellation alternately. i represents a symbol of an output position after the first sub-interleaving processing, i.e., a symbol of an input position of the second sub-interleaving processing, j represents a symbol of an output position of data bits to be transmitted after the second sub-interleaving processing, and a mapping relationship between i and j may be as follows:

$$j = s \left\lfloor \frac{i}{s} \right\rfloor + \left(i + N_{CBPSSI} - \left\lfloor \frac{N_{COL}}{N_{CBPSSI}} \right\rfloor \right) \bmod s, i = 0, 1, \ldots, N_{CBPSSI} - 1;$$

wherein, $s = \max(N_{BPSCS}/2, 1)$.

The third sub-interleaving processing may be to perform a frequency rotation of other spatial streams, reducing the correlation between adjacent bits of different spatial streams. j represents a symbol of an output position after the second sub-interleaving processing, i.e., a symbol of an input position of the third sub-interleaving processing, r represents a symbol of an output position of the data bits to be transmitted after the third sub-interleaving processing. If $N_{ss}$, the number of spatial streams, is greater than or equal to 2 and less than or equal to 4, the mapping relationship between j and r may be as follows:

$$r = \left\{ j - \left[ (2(i_{ss} - 1)) \bmod 3 + 3 \left\lfloor \frac{i_{ss} - 1}{3} \right\rfloor \cdot N_{ROT} \cdot N_{BPSCS} \right] \right\} \bmod N_{CBPSSI},$$

$$j = 0, 1, \ldots, N_{CBPSSI} - 1, i_{ss} = 1, 2, 3 \ldots N_{ss}$$

wherein, $N_{BPSCS}$ is a modulation order; $N_{ROT}$ is a known interleaving parameter of the third sub-interleaving processing. If the number of spatial streams is greater than 4, the mapping relationship between j and r may be as follows:

$$r = \{i - J(i_{ss}) \cdot N_{ROT} \cdot N_{BPSCS}\} \bmod N_{CBPSSI}, j=0,1,2,\ldots N_{CBPSSI}-1, i_{ss}=1,2,3\ldots N_{ss}$$

wherein, the value of $J(i_{ss})$ is relevant to $i_{ss}$, the relationship between the two is as shown in the following table:

TABLE 22-18

| $i_{ss}$ | $J(i_{ss})$ |
|---|---|
| | $J(i_{ss})$ values |
| 1 | 0 |
| 2 | 5 |
| 3 | 2 |
| 4 | 7 |
| 5 | 3 |
| 6 | 6 |
| 7 | 1 |
| 8 | 4 |

Additionally, the relationship between different bandwidths and interleaving parameters may be as shown in the following table:

TABLE 22-17

Number of rows and columns in the interleaver

| Parameter | 20 MHz | 40 MHz | 80 MHz |
|---|---|---|---|
| $N_{COL}$ | 13 | 18 | 26 |
| $N_{ROW}$ | $4 \times N_{BPSCS}$ | $6 \times N_{BPSCS}$ | $9 \times N_{BPSCS}$ |
| $N_{ROT}(N_{SS} \leq 4)$ | 11 | 29 | 58 |
| $N_{ROT}(N_{SS} > 4)$ | 6 | 13 | 28 |

It is worthy of note that the number of data sub-carriers at different bandwidths may also be different, and in the case of a certain bandwidth, the number of data sub-carriers is fixed.

For example, when the bandwidth is 20 MHz, the number of data sub-carriers may be 52; when the bandwidth is 40 MHz, the number of data sub-carriers may be 108; when the bandwidth is 80 MHz, the number of data sub-carriers may be 234. Without limitation to the above listed cases, it may be also configured according to actual needs, and no further details hereto will be given.

Figure 2:
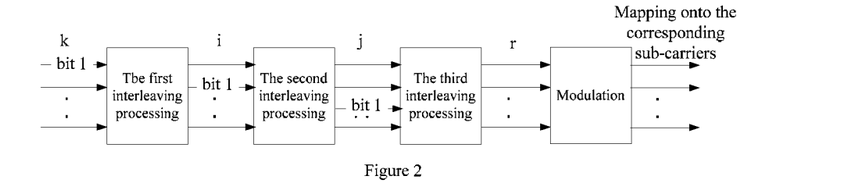
FIG. 2 is a schematic diagram for performing three times of sub-interleaving processing, modulation and mapping on the data sub-carriers according to the present embodiment.

It is worthy of note that in the three times of sub-interleaving processing as shown in FIG. 2, the input position and the output position of each sub-interleaving processing correspond one to one, but may not correspond one to one according to the order of the input positions.

For example, the input position of the transmitted data bit 1 as shown in FIG. 2 before the first sub-interleaving processing is a first input position of the first sub-interleaving processing, and the output position after the first sub-interleaving processing may be a second output position of the first sub-interleaving processing, and thus, an input position of the transmitted data bit before the second sub-interleaving processing is a second input position of the second sub-interleaving processing, and an output position after the second sub-interleaving processing may be a third output position of the second sub-interleaving processing. No further details of the relationship between the input position and the output position of the third sub-interleaving processing will be given, and it may be configured according to actual needs and the corresponding protocols.

Further, after the interleaving processing is performed on the data bits to be transmitted, the WLAN device modulates the data bits to be transmitted after the interleaving processing to obtain modulation signals, and then maps the modulation signals onto the corresponding data sub-carriers for transmission.

As shown in FIG. 2, each input/output position for interleaving in an interleaver corresponds to the corresponding data sub-carriers, i.e., the data bits to be transmitted via any input/output position may be mapped onto the corresponding data sub-carriers and then transmitted.

The embodiment is not limited to the method for modulation of the data bits to be transmitted, and the corresponding relationship between the input/output position and the data sub-carriers, which are well-known technologies by those skilled in the art, and it may be configured according to actual needs, and no further details hereto will be given.

However, in the prior art, when the number of data sub-carriers changes, the corresponding interleaving parameters may be changed accordingly, such that: the modification of interleaver hardware is thereby needed, thus resulting in a high cost.

Figure 3:
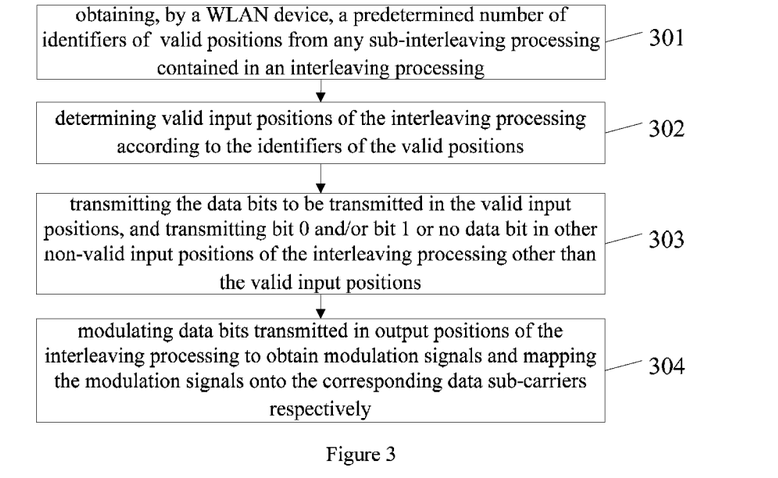
FIG. 3 is a flow diagram of a method for interleaving processing in a WLAN system according to the present embodiment.

To solve the above mentioned problem, the present embodiment provides a method for interleaving processing in a WLAN system; as shown in FIG. 3, the executive body of the method is a WLAN device with an interleaver, and the method may include:

301, obtaining, by the WLAN device, a predetermined number of identifiers of valid positions from any sub-interleaving processing contained in an interleaving processing, wherein the valid positions are input/output positions of any sub-interleaving processing and are used for transmitting data bits to be transmitted, and the number of the valid positions is less than the number of all input/output positions of any sub-interleaving processing;

The present embodiment is not limited to the WLAN device, it may be configured according to actual needs, for example, it may be but not limited to the node, terminal and so on in the WLAN, and no further details hereto will be given.

302, determining valid input positions of the interleaving processing according to the identifiers of the valid positions;

303, transmitting data bits to be transmitted in the valid input positions, and transmitting bit 0 and/or bit 1 or no data bit in other non-valid input positions of the interleaving processing other than the valid input positions;

304, modulating data bits transmitted in output positions of the interleaving processing to obtain modulation signals and mapping the modulation signals onto the corresponding data sub-carriers respectively.

By adopting the above mentioned solution, the WLAN device obtains a predetermined number of identifiers of valid position from any sub-interleaving processing contained in an interleaving processing, wherein the valid positions are input/output positions of any sub-interleaving processing and are used for transmitting data bits to be transmitted, and the number of valid positions is less than the number of all input/output positions of any sub-interleaving processing; determines valid input positions of the interleaving processing according to the identifiers of the valid positions; transmits the data bits to be transmitted in the valid input positions, and transmits bit 0 and/or bit 1 or no data bit in other non-valid input positions of the interleaving processing other than the valid input positions; modulates the data bits transmitted in output positions of the interleaving processing to obtain modulation signals and maps the modulation signals onto the corresponding data sub-carriers respectively. Thus, the number of data sub-carriers used by the interleaver keeps unchanged actually, still all data sub-carriers are used and interleaving parameters may thereby not be changed accordingly, avoiding the problem of a high cost due to modification of interleaver hardware.

Further, the interleaving processing to the data bits to be transmitted includes but not limited to at least one time of sub-interleaving processing.

Further, as shown in FIG. 2, if the interleaving processing includes at least two times of sub-interleaving processing, an output position for performing a current sub-interleaving processing is the input position of the next sub-interleaving processing; and/or, an output position for performing the previous sub-interleaving processing is an input position of the current sub-interleaving processing;

the output position of the interleaving processing is an output position for performing the last sub-interleaving processing; the input position of the interleaving processing is an input position for performing the first sub-interleaving processing; and the valid input positions of the interleaving processing are valid input positions for performing the first sub-interleaving processing.

Figure 4:
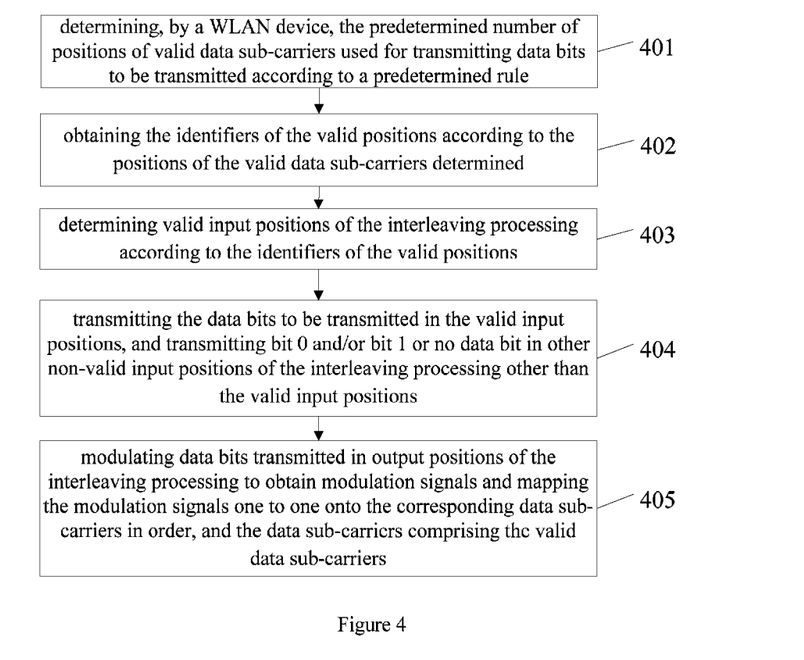
FIG. 4 is a flow diagram of a method for interleaving processing in another WLAN system according to the present embodiment.

The present embodiment provides another method for interleaving processing in a WLAN system, and the method is a further expansion of the method shown in FIG. 3. As shown in FIG. 4, the method may include:

401, determining, by a WLAN device, a predetermined number of positions of valid data sub-carriers used for transmitting the data bits to be transmitted according to a predetermined rule.

As shown in FIG. 2, since each input/output position for interleaving in an interleaver corresponds to the corresponding data sub-carrier, i.e., the modulation signals corresponding to the data bits to be transmitted via any input/output positions may be mapped to the corresponding data sub-carriers and then transmitted. As a result, it may be but is not limited to that in the first place, a WLAN device determines a predetermined number of positions of valid data sub-carriers for transmitting data bits to be transmitted according to a predetermined rule; then, determines identifiers of the valid positions of an interleaver according to the positions of the valid data sub-carriers determined.

The valid positions may be input/output positions of any sub-interleaving processing and used for transmitting data bits to be transmitted, and the number of the valid positions is less than the number of all input/output positions of any sub-interleaving processing.

Further, in order to transmit the data bits to be transmitted better and improve the accuracy of data bits to be transmitted, determining the predetermined number of positions of valid data sub-carrier for transmitting data bits to be transmitted according to a predetermined rule may be but is not limited to determining the predetermined number of positions of data sub-carriers with a higher signal-noise ratio and/or a higher capacity as the positions of the valid data sub-carriers.

The embodiment is not limited to the predetermined rule, which is a technology well known by those skilled in the art and may be configured according to actual needs, and no further details hereto will be given.

402, obtaining identifiers of the valid positions according to the positions of valid data sub-carrier determined.

As an implementation of the present embodiment, a valid position identifier may be but is not limited to: a symbol of the input/output position of any sub-interleaving processing, etc.

As shown in FIG. 2, after the positions of the valid data sub-carrier is determined, symbol r of an output position of the third sub-interleaving processing corresponding to the positions of the valid data sub-carriers determined may be calculated according to the predetermined rule, wherein the number of r is the number of the data sub-carriers multiplied by a modulation order; therefore, it will be appreciated that each data sub-carrier may correspond to input/output positions of interleavers which have the number of modulation order (i.e., the input/output positions of the interleaver are the input/output positions of the interleaving processing); after the corresponding r is determined, the k corresponding to the positions of the valid data sub-carriers determined may be calculated according to the relationship equations between r and j, j and i, as well as i and k, so that the WLAN device may perform interleaving processing on the data bits to be transmitted in a position corresponding to the calculated k.

The embodiment is not limited to the method for determining the identifiers of the valid positions according to the positions of the valid data sub-carriers, which is a technology well known by those skilled in the art and may be configured according to actual needs, and no further details hereto will be given.

403, determining valid input positions of the interleaving processing according to the valid position identifiers.

As an implementation of the present embodiment, as shown in FIG. 2, the valid input position k of the interleaving processing is determined according to the identifiers of the valid positions.

404, transmitting data bits to be transmitted in the valid input positions, and transmitting bit 0 and/or bit 1 or no data bit in other non-valid input positions of the interleaving processing other than the valid input positions.

Since not all data sub-carriers are used, therefore, the modulation signals corresponding to the data bits to be transmitted are mapped onto the valid data sub-carriers, other data sub-carriers, onto which the data bits to be transmitted are not mapped, are mapped onto the modulation signals corresponding to bit 0 and/or bit 1 or are not mapped onto modulation signals, and thus, all data sub-carriers are used actually, such that the number of the data sub-carriers keeps unchanged, which may ensure that interleaving parameters keep unchanged.

The embodiment is not limited to the method for mapping the data bits onto the data sub-carriers, which is a technology well known by those skilled in the art, and no further details hereto will be given.

405, modulating data bits transmitted in the output positions of the interleaving processing to obtain modulation signals and mapping the modulation signals one to one onto the corresponding data sub-carriers in order, wherein the data sub-carriers include the valid data sub-carriers.

As an implementation of the present embodiment, since the WLAN device calculates the identifiers (i.e., k) of the valid positions according to the determined positions of the valid data sub-carriers, therefore, the output position identifiers (i.e., r) after three times of sub-interleaving processing are performed on the data bits to be transmitted according to the calculated identifiers of the valid positions respectively correspond to the determined data sub-carriers respectively, i.e., the data bits to be transmitted after three times of sub-interleaving processing are performed on the data bits to be transmitted according to the calculated identifiers of the valid positions will be mapped one to one onto the corresponding valid data sub-carriers in order.

It is worthy of note that the predetermined number and predetermined rule provided in the present embodiment may be but is not limited to being determined according to the 802.11 a/g/n/ac/ah standard.

The embodiment is not limited to the adjustment processing, which is a technology well known by those skilled in the art and may be configured according to actual needs, and no further details hereto will be given.

By adopting the above mentioned solution, the WLAN device obtains a predetermined number of identifiers of valid positions from any sub-interleaving processing contained in the interleaving processing, wherein the valid positions are input/output positions of any sub-interleaving processing and used for transmitting data bits to be transmitted, and the number of valid positions is less than the number of all input/output positions of any sub-interleaving processing; determines valid input positions of the interleaving processing according to the identifiers of the valid position; transmits the data bits to be transmitted in the valid input positions, and transmits bit 0 and/or bit 1 or no data bit in other non-valid input positions of the interleaving processing other than the valid input positions; modulates the data bits transmitted in output positions of the interleaving processing to obtain modulation signals and maps respectively the modulation signals onto the corresponding data sub-carriers. Thus, the number of data sub-carriers used by the interleaver keeps unchanged actually, still all data sub-carriers are used and interleaving parameters may thereby not be changed accordingly, avoiding the problem of a high cost due to modification of interleaver hardware.

Figure 5:
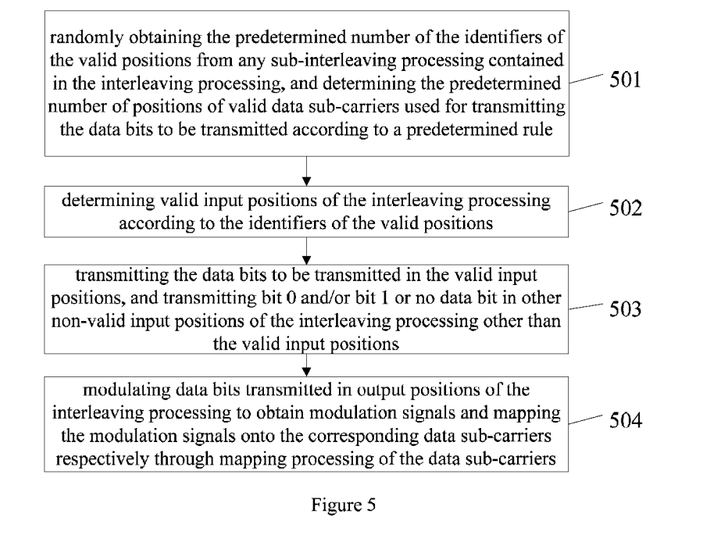
FIG. 5 is a flow diagram of a method for interleaving processing in yet another WLAN system according to the present embodiment.

The present embodiment provides an interleaving processing method in another WLAN system, and the method is a further expansion of the method shown in FIG. 3. As shown in FIG. 5, and the method may include:

501, randomly obtaining a predetermined number of identifiers of valid positions from any sub-interleaving processing contained in the interleaving processing, and determine a predetermined number of positions of valid data sub-carrier used for transmitting the data bits to be transmitted according to a predetermined rule.

The present embodiment determines the valid output position of an interleaving processing based on the determined valid position of an interleaver, maps the modulation signals corresponding to the data bits to be transmitted carried in the valid output position onto the corresponding data sub-carriers respectively and then transmits them.

As an implementation of the present embodiment, when the bandwidth is 20 MHz and the modulation order is 1, the number of input/output positions of any sub-interleaving processing is 52; when the predetermined number is 46, as shown in FIG. 2, the positions of the first sub-interleaving processing, of which the input position symbols (k) are 0-45, may be obtained, i.e. the input position symbols 0-45 of the first sub-interleaving processing are taken as valid position identifiers.

It is worthy of note that the symbols of the valid positions are not limited to the symbols of input valid positions of the first sub-interleaving processing, which may be the symbols of input/valid output positions of any sub-interleaving processing, but not limited thereto.

The present embodiment is not limited to the method for obtaining a predetermined number of identifiers of valid position, which may be configured according to actual needs; for example, it may be but is not limited to obtaining one symbol at an interval of two symbols, and no further details hereto will be given.

Further, determining, by the WLAN device, a predetermined number of valid data sub-carrier for transmitting data bits to be transmitted according to a predetermined rule may be but is not limited to determining a predetermined number of positions of data sub-carriers with a higher signal-noise ratio and/or a higher capacity as the positions of the valid data sub-carriers.

502, determining valid input positions of the interleaving processing according to the identifiers of the valid positions.

As an implementation of the present embodiment, as shown in FIG. 2, if the identifiers of the valid positions are not symbols (i.e. k) of the input valid positions of the first sub-interleaving processing, the k value corresponding to a determined data sub-carrier may be calculated based on the above recorded relationship equations between r and j, j and i, and i and k, so that the WLAN device may perform interleaving processing on the data bits to be transmitted based on a position corresponding to the calculated k.

503, transmitting data bits to be transmitted in the valid input positions, and transmit bit 0 and/or bit 1 or no data bit in other non-valid input positions of the interleaving processing other than the valid input positions.

504, modulating data bits transmitted in output positions of the interleaving processing to obtain modulation signals and mapping the modulation signals onto the corresponding data sub-carriers respectively through mapping processing of the data sub-carriers.

Further, if bit 0 and/or bit 1 is transmitted in other non-valid input positions of the interleaving processing other than the valid input positions, the modulating data bits transmitted in output positions of the interleaving processing to obtain modulation signals may include but is not limited to:

modulating bits to be interleaved transmitted in at least one valid input position to obtain at least one modulation signal, and modulating bits to be interleaved transmitted in at least one non-valid position to obtain at least one modulation signal, until finishing the modulation of data bits transmitted in all interleaving processing output positions.

Figure 6:
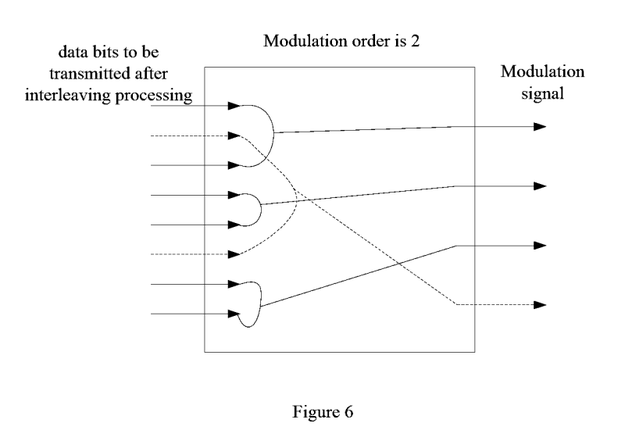
FIG. 6 is a schematic diagram of the modulation in the method shown in FIG. 5.

As an implementation of the present embodiment, as shown in FIG. 6, a schematic diagram of input bits before modulation and modulation signals after modulation is illustrated. The solid line shows the data bits to be transmitted in valid input positions and the dotted line shows the data bits to be transmitted in non-valid input positions, and the modulation order is 2.

Further, if no data bit is transmitted in other non-valid input positions of the interleaving processing other than the valid input positions, the modulating data bits transmitted in output positions of the interleaving processing to obtain modulation signals may include:

modulating bits to be interleaved transmitted in at least one valid input position to obtain at least one modulation signal, until finishing the modulation of data bits transmitted in all interleaving processing output positions.

The embodiment is not limited to the specific modulation procedure, which is a technology well known by those skilled in the art and specific parameters may be configured according to actual needs, and no further details hereto will be given.

The embodiment is not limited to the mapping processing of the data sub-carriers, which is a technology well known by those skilled in the art and may be configured according to actual needs, and no further details hereto will be given.

By adopting the above mentioned solution, the WLAN device obtains a predetermined number of identifiers of valid positions from any sub-interleaving processing included in an interleaving processing, wherein the valid positions are input/output positions of any sub-interleaving processing and used for transmitting data bits to be transmitted, and the number of valid positions is less than the number of all input/output positions of any sub-interleaving processing; determines valid input positions of the interleaving processing according to the identifiers of the valid positions; transmits the data bits to be transmitted in the valid input positions, and transmits bit 0 and/or bit 1 or no data bit in other non-valid input positions of the interleaving processing other than the valid input positions; modulates the data bits transmitted in output positions of the interleaving processing to obtain modulation signals and maps the modulation signals onto the corresponding data sub-carriers respectively. Thus, the number of data sub-carriers used by the interleaver keeps unchanged actually, still all data sub-carriers are used and interleaving parameters may thereby not be changed accordingly, avoiding the problem of a high cost due to modification of interleaver hardware.

A plurality of apparatus embodiments are provided in the following with all of them corresponding to the above described method embodiments; implementations of apparatus and members contained in the apparatus are as same as methods provided in the method embodiments.

Figure 7:
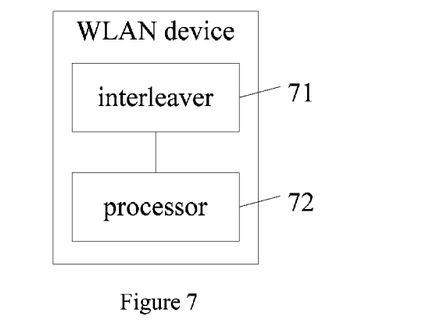
FIG. 7 is a structural schematic diagram of the WLAN device according to the present embodiment.

The present embodiment provides a WLAN device, as shown in FIG. 7, and it may include:

an interleaver 71, configured to perform interleaving processing on the data bits to be transmitted;

a processor 72, configured to obtain a predetermined number of identifiers of valid positions from any sub-interleaving processing contained in the interleaving processing performed by the interleaver, wherein the valid positions are input/output positions of any sub-interleaving processing and used for transmitting data bits to be transmitted, and the number of valid positions is less than the number of all input/output positions of any sub-interleaving processing; determine the valid input positions of the interleaving processing according to the identifiers of the valid positions; transmit the data bits to be transmitted in the valid input positions, and transmits bit 0 and/or bit 1 or no data bit in other non-valid input positions of the interleaving processing other than the valid input positions; modulate the data bits transmitted in output positions of the interleaving processing to obtain modulation signals and map the modulation signals onto the corresponding data sub-carriers respectively.

By adopting the above mentioned solution, the processor obtains a predetermined number of identifiers of valid positions from any sub-interleaving processing contained in the interleaving processing, wherein the valid positions are input/output positions of any sub-interleaving processing and used for transmitting data bits to be transmitted, and the number of the valid positions is less than the number of all input/output positions of any sub-interleaving processing; determines valid input positions of the interleaving processing according to the identifiers of the valid positions; transmits the data bits to be transmitted in the valid input positions, and transmits bit 0 and/or bit 1 or no data bit in other non-valid input positions of the interleaving processing other than the valid input positions; modulates the data bits transmitted in output positions of the interleaving processing to obtain modulation signals and maps the modulation signals onto the corresponding data sub-carriers respectively. Thus, the number of data sub-carriers used by the interleaver keeps unchanged actually, still all data sub-carriers are used and interleaving parameters may thereby not be changed accordingly, avoiding the problem of a high cost due to modification of interleaver hardware.

Figure 8:
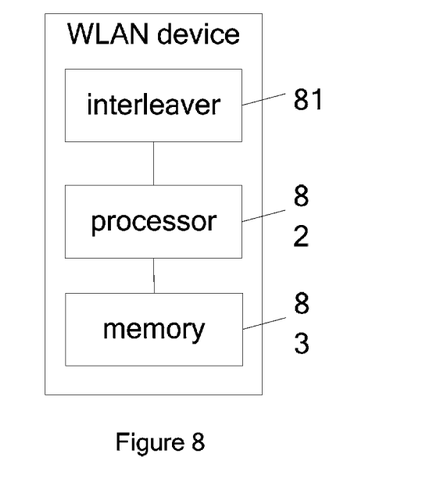
FIG. 8 is a structural schematic diagram of another WLAN device according to the present embodiment.

The present embodiment provides another WLAN device, as shown in FIG. 8, the WLAN device is the further expansion of the WLAN device as shown in FIG. 7, and it may include:

an interleaver 81, configured to perform interleaving processing on the data bits to be transmitted;

a processor 82, configured to obtain a predetermined number of identifiers of valid positions from any sub-interleaving processing contained in the interleaving processing performed by the interleaver, wherein the valid positions are input/output positions of any sub-interleaving processing and used for transmitting data bits to be transmitted, and the number of the valid positions is less than the number of all input/output positions of any sub-interleaving processing; determine valid input positions of the interleaving processing according to the identifiers of the valid positions; transmits the data bits to be transmitted in the valid input positions, and transmit bit 0 and/or bit 1 or no data bit in other non-valid input positions of the interleaving processing other than the valid input positions; modulate the data bits transmitted in output positions of the interleaving processing to obtain modulation signals and map the modulation signals onto the corresponding data sub-carriers respectively.

Further, the interleaving processing performed by the interleaver 81 on the data to be transmitted includes at least one time of sub-interleaving processing.

Further, if the interleaving processing performed by the interleaver 81 on the data bits to be transmitted includes at least two times of sub-interleaving processing, an output position for performing a current sub-interleaving processing is an input position of a next sub-interleaving processing; and/or, an output position for performing the previous sub-interleaving processing is an input position of a current sub-interleaving processing;

an output position of the interleaving processing is an output position for performing the last sub-interleaving processing; an input position of the interleaving processing is an input position for performing the first sub-interleaving processing; and the valid input positions of the interleaving processing are valid input positions for performing the first sub-interleaving processing.

Further, the WLAN device may further include:

a memory 83, configured to store identifiers of the input/output positions of each sub-interleaving processing performed by the interleaver;

a processor 82, configure to determine a predetermined number of positions of valid data sub-carriers used for transmitting the data bits to be transmitted according to a predetermined rule; obtain identifiers of valid positions from the memory according to the determined positions of the valid data sub-carriers; maps the modulation signals one to one onto the corresponding data sub-carriers in order, wherein the data sub-carriers include the valid data sub-carriers.

Further, the processor 82 is configured to determine the predetermined number of positions of valid data sub-carriers used for transmitting the data bits to be transmitted according to a predetermined rule; randomly obtain predetermined number of identifiers of valid positions from any sub-interleaving processing contained in the interleaving processing; and map the modulation signals onto the corresponding data sub-carriers respectively through the mapping processing of data sub-carriers.

Further, the processor 82 is further configured to modulate the bits to be interleaved transmitted in at least one valid position to obtain at least one modulation signal if bit 0 and/or bit 1 is transmitted in other non-valid input positions of an interleaving processing other than the valid input positions, and modulate bits to be interleaved transmitted in at least one non-valid position to obtain at least one modulation signal, until finishing the modulation of data bits transmitted in all interleaving processing output positions.

Further, the processor 82 is further configure to modulate the bits to be interleaved transmitted in at least one valid input position to obtain at least one modulation signal if no data bit is transmitted in other non-valid input positions of an interleaving processing other than the valid input positions, until the modulation of data bits transmitted in all interleaving processing output positions is finished.

Further, the processor 82 is further configured to determine the predetermined number of positions of data sub-carriers with a higher signal-noise ratio and/or a higher capacity as the positions of the valid data sub-carriers.

By adopting the above mentioned solution, the processor obtains a predetermined number of identifiers of valid positions from a memory, wherein the valid positions are input/output positions of any sub-interleaving processing and used for transmitting data bits to be transmitted, and the number of valid positions is less than the number of all input/output positions of said sub-interleaving processing; determine valid input positions of an interleaving processing according to the identifiers of the valid positions; transmit the data bits to be transmitted in the valid input positions, and transmits bit 0 and/or bit 1 or no data bit in other non-valid input positions of the interleaving processing other than the valid input positions; modulate the data bits transmitted in output positions of the interleaving processing to obtain modulation signals and map the modulation signals onto the corresponding data sub-carriers respectively. Thus, the number of the data sub-carriers used by the interleaver keeps unchanged actually, still all data sub-carriers are used and interleaving parameters may thereby not be changed accordingly, avoiding the problem of a high cost due to modification of interleaver hardware.

By the above described embodiments, it is readily apparent to those skilled in the art that the present invention may be realized by software plus necessary universal hardware, also of course, by hardware only, but in most cases, the former is a better implementation. With such an understanding, the technical solution of the present invention substantially or its portion that contributes to the prior art may be embodied in the form of a computer software product which is stored in a readable memory media, such as a floppy disk, hard disk or compact disk, etc. of a computer, including a plurality of instructions such that a computer (may be a personal computer, a server, or a network device, etc.) executes the methods described in each of all the embodiments.

The above descriptions are merely specific implementation of the present invention, but not intended to limit the protection scope of the present invention. The variation or replacement easily thought of by those skilled in the art within the technical scope disclosed by the present invention, shall fall within the protection scope of the present invention. Therefore, the protection scope of the present invention should be determined with reference to the protection scope of the claims.

What is claimed is:

1. A method for an interleaving processing in a Wireless Local Area Networks (WLAN) system, the method comprising:
   obtaining, by a WLAN device, a predetermined number of identifiers of valid positions from any sub-interleaving processing contained in the interleaving processing, wherein the valid positions are input/output positions of said any sub-interleaving processing and are used for transmitting data bits to be transmitted, and a quantity of the valid positions is less than a quantity of all input/output positions of said any sub-interleaving processing;
   determining valid input positions of the interleaving processing according to the identifiers of the valid positions;
   transmitting data bits to be transmitted in the valid input positions, and transmitting bit 0 and/or bit 1 or no data bit in other non-valid input positions of the interleaving processing other than the valid input positions;
   modulating data bits transmitted in the output positions of the interleaving processing to obtain modulation signals and mapping the modulation signals onto the corresponding data sub-carriers, respectively.

2. The method of claim 1, wherein said interleaving processing comprises at least one time of sub-interleaving processing.

3. The method of claim 2, wherein when the interleaving processing comprises at least two times of sub-interleaving processing, an output position for performing a current sub-interleaving processing is an input position of a next sub-interleaving processing; and/or, an output position for performing a previous sub-interleaving processing is an input position of the current sub-interleaving processing;
   the output position of the interleaving processing is an output position for performing a last sub-interleaving processing; an input position of the interleaving processing is an input position for performing a first sub-interleaving processing; and the valid input positions of the interleaving processing are valid input positions for performing the first sub-interleaving processing.

4. The method of claim 1, wherein obtaining the predetermined number of the identifiers of the valid positions from any sub-interleaving processing contained in the interleaving processing comprises:
   determining the predetermined number of positions of valid data sub-carriers used for transmitting the data bits to be transmitted according to a predetermined rule;
   obtaining the identifiers of the valid positions according to the positions of the determined valid data sub-carriers,
   wherein mapping the modulation signals onto the corresponding data sub-carriers respectively comprises:
   mapping the modulation signals one to one onto the corresponding data sub-carriers in order, the data sub-carriers comprising the valid data sub-carriers.

5. The method of claim 2, wherein obtaining the predetermined number of the identifiers of the valid positions from any sub-interleaving processing contained in the interleaving processing comprises:
   determining the predetermined number of positions of valid data sub-carriers used for transmitting the data bits to be transmitted according to a predetermined rule;
   obtaining the identifiers of the valid positions according to the positions of the determined valid data sub-carriers,
   wherein mapping the modulation signals onto the corresponding data sub-carriers respectively comprises:
   mapping the modulation signals one to one onto the corresponding data sub-carriers in order, the data sub-carriers comprising the valid data sub-carriers.

6. The method of claim 3, wherein obtaining the predetermined number of the identifiers of the valid positions from any sub-interleaving processing contained in the interleaving processing comprises:
   determining the predetermined number of positions of valid data sub-carriers used for transmitting the data bits to be transmitted according to a predetermined rule;
   obtaining the identifiers of the valid positions according to the positions of the determined valid data sub-carriers,
   wherein mapping the modulation signals onto the corresponding data sub-carriers respectively comprises:
   mapping the modulation signals one to one onto the corresponding data sub-carriers in order, the data sub-carriers comprising the valid data sub-carriers.

7. The method of claim 1, the method further comprising:
   determining the predetermined number of positions of valid data sub-carriers used for transmitting the data bits to be transmitted according to a predetermined rule, wherein obtaining the predetermined number of the identifiers of the valid positions from any sub-interleaving processing contained in the interleaving processing comprising:
randomly obtaining the predetermined number of the identifiers of the valid positions from any sub-interleaving processing contained in the interleaving processing,
wherein mapping the modulation signals onto the corresponding data sub-carriers respectively comprises:
mapping the modulation signals onto the corresponding data sub-carriers respectively through mapping processing of the data sub-carriers.

8. The method of claim 7, wherein when bit 0 and/or bit 1 is transmitted in the other non-valid input positions of the interleaving processing other than the valid input positions, said modulating data bits transmitted in the output positions of the interleaving processing to obtain the modulation signals comprises:
modulating bits to be interleaved transmitted in at least one valid input position to obtain at least one modulation signal, and modulating bits to be interleaved transmitted in at least one non-valid input position to obtain at least one modulation signal, until finishing the modulation of data bits transmitted in all output positions of the interleaving processing.

9. The method of claim 7, wherein when no data bit is transmitted in other non-valid input positions of the interleaving processing other than the valid input positions, said modulating data bits transmitted in the output positions of the interleaving processing to obtain the modulation signals comprises:
modulating bits to be interleaved transmitted in at least one valid input position, to obtain at least one modulation signal, until finishing the modulation of data bits transmitted in all output positions of the interleaving processing.

10. The method of claim 4, wherein the determining the predetermined number of positions of the valid data sub-carriers used for transmitting the data bits to be transmitted according to the predetermined rule comprises:
determining the predetermined number of positions of data sub-carrier with a higher signal-noise ratio and/or a higher capacity as the positions of the valid data sub-carriers.

11. A Wireless Local Area Networks (WLAN) device, comprising:
an interleaver, configured to perform an interleaving processing on data bits to be transmitted;
a processor, configured to obtain a predetermined number of identifiers of valid positions from any sub-interleaving processing contained in the interleaving processing performed by the interleaver, wherein the valid positions are input/output positions of said any sub-interleaving processing and used for transmitting data bits to be transmitted, and a quantity of the valid positions being less than a quantity of all input/output positions of said any sub-interleaving processing; determine valid input positions of the interleaving processing according to the identifiers of the valid positions; transmit data bits to be transmitted in the valid input positions and transmit bit 0 and/or bit 1 or no data bit in other non-valid input positions of the interleaving processing other than the valid input positions; modulate data bits transmitted in the output positions of the interleaving processing to obtain modulation signals and map the modulation signals onto the corresponding data sub-carriers, respectively.

12. The WLAN device of claim 11, wherein the interleaving processing performed by the interleaver on the data bits to be transmitted comprises at least one time of sub-interleaving processing.

13. The WLAN device of claim 12, wherein when the interleaving processing performed by the interleaver on the data bits to be transmitted comprises at least two times of sub-interleaving processing, an output position for performing a current sub-interleaving processing is an input position of a next sub-interleaving processing; and/or, an output position for performing a previous sub-interleaving processing is an input position of the current sub-interleaving processing;
the output position of the interleaving processing is an output position for performing a last sub-interleaving processing; an input position of the interleaving processing is an input position for performing a first sub-interleaving processing; and the valid input positions of the interleaving processing are valid input positions for performing the first sub-interleaving processing.

14. The WLAN device of claim 11, further comprising:
a memory, configured to store identifiers of the input/output positions of each sub-interleaving processing performed by the interleaver;
the processor, further configured to determine the predetermined number of positions of valid data sub-carriers used for transmitting the data bits to be transmitted according to a predetermined rule; obtain the identifiers of the valid positions from the memory according to the positions of the determined valid data sub-carriers; mapping the modulation signals one to one onto the corresponding data sub-carriers in order, wherein the data sub-carriers comprise the valid data sub-carriers.

15. The WLAN device of claim 12, further comprising:
a memory, configured to store identifiers of the input/output positions of each sub-interleaving processing performed by the interleaver;
the processor, further configured to determine the predetermined number of positions of valid data sub-carriers used for transmitting the data bits to be transmitted according to a predetermined rule; obtain the identifiers of the valid positions from the memory according to the positions of the determined valid data sub-carriers; mapping the modulation signals one to one onto the corresponding data sub-carriers in order, wherein the data sub-carriers comprise the valid data sub-carriers.

16. The WLAN device of claim 13, further comprising:
a memory, configured to store identifiers of the input/output positions of each sub-interleaving processing performed by the interleaver;
the processor, further configured to determine the predetermined number of positions of valid data sub-carriers used for transmitting the data bits to be transmitted according to a predetermined rule; obtain the identifiers of the valid positions from the memory according to the positions of the determined valid data sub-carriers; mapping the modulation signals one to one onto the corresponding data sub-carriers in order, wherein the data sub-carriers comprise the valid data sub-carriers.

17. The WLAN device of claim 11, wherein the processor is further configured to determine the predetermined number of positions of valid data sub-carriers used for transmitting data bits to be transmitted according to a predetermined rule; randomly obtain the predetermined number of identifiers of the valid position from any sub-interleaving processing contained in the interleaving processing; and map the modulation signals onto the corresponding data sub-carriers respectively through mapping processing of the data sub-carriers.

18. The WLAN device of claim 17, wherein the processor is further configured to modulate bits to be interleaved transmitted in at least one valid input position to obtain at least one modulation signal and modulate bits to be interleaved transmitted in at least one non-valid input position to obtain at least one modulation signal when bit 0 and/or bit 1 is transmitted in other non-valid input positions of the interleaving processing other than the valid input positions, until finishing the modulation of data bits transmitted in all output positions of the interleaving processing.

19. The WLAN device of claim 17, wherein the processor is further configured to modulate bits to be interleaved transmitted in at least one valid input position to obtain at least one modulation signal when no data bit is transmitted in other non-valid input positions of the interleaving processing other than the valid input positions, until finishing the modulation of data bits transmitted in all output positions of the interleaving processing.

20. The WLAN device of claim 14, wherein the processor is configured to determine the predetermined number of positions of data sub-carrier with a higher signal-noise ratio and/or a higher capacity as the positions of the valid data sub-carrier.

\* \* \* \* \*